Patented Nov. 23, 1926.

1,607,817

UNITED STATES PATENT OFFICE.

LOUIS M. DENNIS, OF ITHACA, NEW YORK.

GLASS CONTAINING GERMANIUM.

No Drawing.    Application filed January 14, 1925. Serial No. 2,312.

This invention relates to the production of new kinds of glass, namely, germanium-containing glass. The invention includes the new kinds of glass, as well as the method of their production.

The new glass of the present invention is characterized by the fact that it contains germanium. The new glass is made by suitably combining with other appropriate constituents a compound or compounds of germanium, and particularly germanium dioxide. Germanium dioxide is amphoteric, having both acid and basic properties. Either its acid or its basic properties are taken advantage of in using it in the manufacture of the new kinds of glass. Instead of germanium dioxide, other germanium compounds can be used, particularly those in which the germanium oxide usually functions as the acid substance.

The other compounds with which the germanium oxide or other germanium compounds can be used, for the manufacture of the new glass, can be varied. The germanium oxide may, for example, be used in place of silicon dioxide, in whole or in part, in glass formulas or compounds in which silicon dioxide is now used as the primary acid constituent, although the invention is not restricted to the making of glass of this kind.

In carrying out the process and in making the new glass, a compound of germanium together with other substances, such as alkali and compound of lead, are heated together to such a temperature as will render the mixture fluid and homogeneous. For example, a compound of potassium, such as potassium carbonate, together with a compound of lead, such as lead monoxide, and germanium dioxide, can be heated together, until the mixture melts and becomes fluid and homogeneous. On cooling, a clear transparent glass results.

Instead of using potassium or lead compounds, other compounds can be employed as basic constituents. So also, other compounds of germanium than the dioxide may be used.

The invention will be further illustrated by the following specific examples, but it is intended and will be understood that the invention is not limited thereto, and that variations may be made in the constituents used in making the new kinds of glass.

A mixture of lead oxide and germanium dioxide is melted together until a fluid and homogeneous mass is obtained, the lead oxide and the germanium dioxide being used in approximately the proportions of 8.4 parts of lead oxide ($Pb_3O_4$) to 3.13 parts of germanium dioxide the latter being present to the extent of about 27%. On cooling the homogeneous fluid mass, a clear transparent glass is obtained.

In a similar way a glass may be made by melting together lead oxide, potassium carbonate, and germanium dioxide in approximately the proportions of 6.5 parts of lead oxide ($Pb_3O_4$), 1 part of potassium carbonate, 8.7 parts of germanium dioxide, 0.3 parts of potassium nitrate.

In a similar manner, a glass may be made by melting together lead oxide, thallium carbonate and germanium dioxide in approximately the proportions of 8.0 parts of thallium carbonate, 13 parts of lead oxide, $Pb_3O_4$, 17.4 parts of germanium dioxide, and 0.6 part of potassium nitrate.

The new glass of the present invention is characterized, from a chemical standpoint, by its content of germanium which may vary in amount and in its relation to the other compounds which may also vary.

The optical properties of the different types of germanium glass will vary. The following measurement of the dispersion of the three types of glass referred to in the three specific examples will serve to illustrate certain of the optical properties of certain of the new kinds of germanium glass:

| Types of glass. | $N_D$. | Partial dispersion $N_D - N_C$. | Partial dispersion $N_F - N_D$. | Partial dispersion $N_G - N_F$. | Mean dispersion $N_F - N_C$. | Effective refractivity $=\frac{N_D - 1}{N_F - N_C}$ |
|---|---|---|---|---|---|---|
| Lead-germanium | 2.068 | 0.012 | 0.043 | 0.064 | 0.055 | 19.4 |
| Lead-potassium germanium | 1.794 | 0.011 | 0.021 | 0.021 | 0.032 | 24.8 |
| Lead-thallium germanium | 1.848 | 0.011 | 0.013 | 0.024 | 0.024 | 35.3 |

It will thus be seen that the glass of the present invention possesses characteristic and distinguishing optical properties which render it particularly advantageous for special optical and other purposes.

I claim:

1. The method of producing a transparent germanium containing glass, which comprises heating together a mixture of a germanium compound, acting as an acid constituent of the glass, with a compound of a basic element which will react therewith to form a homogeneous transparent fluid.

2. The method of producing a transparent germanium glass, which comprises fusing together germanium dioxide acting as an acid constituent of the glass with a compound which will react therewith to produce a transparent glass.

3. The method of producing a transparent germanium glass, which comprises fusing together a mixture consisting of germanium dioxide, an alkali metal compound, and a lead compound.

4. The method of producing a transparent germanium glass, which comprises fusing together a mixture comprising a germanium compound and a lead compound.

5. The method of producing a transparent germanium glass, which comprises fusing together a mixture consisting essentially of a germanium compound and a lead compound, and one or more compounds of other elements.

6. As a new product, a transparent glass containing a germanium compound in excess of about 27% calculated as oxide.

7. As a new product, a transparent glass containing germanium oxide as an acid constituent together with one or more compounds acting as a base.

8. As a new product, a transparent glass containing germanium oxide and lead compounds, the germanium oxide acting as an acid constituent of the glass.

9. As a new product, a transparent glass consisting of germanium, lead and an alkali metal.

10. As a new product, a transparent glass made from a formula in which germanium dioxide replaces in part or in whole silica as an acid constituent of the mixture.

In testimony whereof I affix my signature.

LOUIS M. DENNIS.